United States Patent
Herrmann et al.

[11] Patent Number: 5,979,663
[45] Date of Patent: Nov. 9, 1999

[54] DEVICE FOR RECOVERING ABRASIVES IN WATER JET CUTTING SYSTEMS

[75] Inventors: Rolf Herrmann, Sohland; Alfred Lehmann, Schmolln-Putzkau; Matthias Walden, Sohland; Gottfried Wobst, Ringenhain, all of Germany

[73] Assignee: Sachsische Werkzeug und Sondermaschinene GmbH, Germany

[21] Appl. No.: 09/101,119

[22] PCT Filed: Oct. 22, 1997

[86] PCT No.: PCT/DE97/02468

§ 371 Date: Jun. 30, 1998

§ 102(e) Date: Jun. 30, 1998

[87] PCT Pub. No.: WO98/18598

PCT Pub. Date: May 7, 1998

[30] Foreign Application Priority Data

Oct. 30, 1996 [DE] Germany ................... 196 43 807

[51] Int. Cl.⁶ .................. B07B 4/00; B03B 1/00
[52] U.S. Cl. .................. 209/139.1; 209/138; 209/140; 209/3
[58] Field of Search ................... 209/3, 11, 138, 209/139.1, 140, 141, 142, 146, 147

[56] References Cited

U.S. PATENT DOCUMENTS 3,455,449  7/1969  Nara .
3,655,043  4/1972  Wochnowski et al. ............... 209/138
4,306,891  12/1981  Clarke et al. ......................... 55/274
4,765,545  8/1988  Van Kruining ......................... 241/5

*Primary Examiner*—Donald P. Walsh
*Assistant Examiner*—Daniel K. Schlak
*Attorney, Agent, or Firm*—Pepe & Hazard LLP

[57] ABSTRACT

An assembly for abrasive agent recovery in water jet cutting units including a separator (4) for separating usable abrasive agent from sludge and water and a drying oven (9). A conveyor (6) follows the separator (4) for transporting the overwhelmingly usable abrasive agent separated in portions by the separator (4) and compression rollers (30) adjacent the conveyors press remaining water out of the portions located on the conveyor. The portions on the conveyor are blown by a compressed air unit (8) and a spraying nozzle into the drying oven (9), through which warmed exhaust air, further heated in the drying oven (9), flows. The drying oven (9) consists of a climbing shaft (12), closed via a heater (10) with a screen (11), an eddy chamber (16) connected to a funnel (17) to the lower end the eddy chamber (16), a line (18) from the eddy chamber (16) to a catching tank (19), and a suction connection (20). A fan 22 for removing the exhaust air, is connected to the suction connection (20) via an exhaust section (21) and filtering the exhaust air.

8 Claims, 3 Drawing Sheets

DEVICE FOR RECOVERING ABRASIVES IN WATER JET CUTTING SYSTEMS

BACKGROUND OF THE INVENTION

The invention concerns an arrangement for recovery of usable abrasive agents in water jet cutting units from the water used by a water jet trapping device, loaded with cut material residues and used abrasive material.

A system for separating abrasive material from a fluid is known from U.S. Pat. No. 4,872,975 granted to Benson . . ., in the case of which the fluid collected in a catching tank, which contains the abrasive agent, is fed to a separator. In the separator the sludge is separated from the water. The sludge is fed to a settling basin, from which the precipitated abrasive agent is removed. This system serves for water recovery by separating the sludge from the water. A unit for recovery of the abrasive material in the case of water jet cutting is known from the specification of German Patent DE 41 06 832 B 26 F 3/00, in the case of which the abrasive material mixed with cut material residues is conveyed to a drying unit from the catching basin for the residue jet by means of a scraper and a conveyor belt. The abrasive material is conveyed through the drying unit, dried by heat radiation, and then blown into a wind sifter in a sorting channel. The particles of the abrasive material are carried in the air stream to a distance depending on their size and fall into the slits of the sorting channel associated with the different size fractions. The abrasive material now can be reused corresponding to the fractions. In this case, dust should occur as a separate fraction. However, a certain amount of dust cannot be avoided in any other fraction.

A device for cutting agent recovery in the case of abrasive water jet cutting is known from the specification of German Patent DE 43 34 673 B26F 3/00, in the case of which the cutting agent is flushed into a sedimentation tank under outlet openings of funnel elements in a ring line with conveying water. The further treatment of the abrasive agent is not described here.

In addition, a unit for separating and recovery of abrasive agents in the case of water abrasive jet application is known from German Offenlegungsschrift 43 03 868.

From the suspension of usable abrasive agent, sludge, cut material residues, and water removed from the catching system, the abrasive agent fraction is discharged to a first hydrocyclone and delivered for further processing. The abrasive agent is removed from the remaining water with a revolving belt filter. The abrasive agent is dried in a connected rotating pipe oven and delivered to a collecting tank. The remaining sludge, which is delivered to a disposal station, is separated from the water in a further hydrocyclone. In this case there is no separation of the dust contained in the usable abrasive agent and delivered from the first hydrocyclone.

The purpose and task of the invention is to create a novel arrangement for recovery of used abrasive agent in water jet cutting units, in which the abrasive agent is dry and largely dustless.

The solution of this task is the subject of the first claim. Further advantageous configurations of the invention are the subject of the subclaims.

SUMMARY OF THE INVENTION

It has now been found that the foregoing and related objects may be readily attained in an assembly for abrasive agent recovery in water jet cutting units comprising a separator for separating usable abrasive agent from sludge and water, a drying oven, and a conveyor for transporting the overwhelmingly usable abrasive agent separated into fractions by the separator. A compressed air unit in the drying oven cooperating with a spraying nozzle and warmed exhaust air heated further in the drying oven, causes abrasive agent on the conveyor to flow upwardly through the oven. The oven includes a climbing shaft closed at its lower end by a heater and a screen. An eddy chamber is connected with the shaft and a funnel is located under the eddy chamber. A conduit extends from the funnel to a catching tank for the usable, dried abrasive agent obtained. There is a suction connection to the eddy chamber and a fan for removing the exhaust air is connected with the suction connection through an exhaust chamber which filters the exhaust air.

Preferably, compression rollers cooperate with the conveyor to press portions of abrasive agent on the conveyor, and the spraying nozzle consists of a nozzle pipe in which a nozzle unit is located, and at the front of which are opening air nozzles arranged transversely of the axis of the nozzle unit.

The nozzle pipe extends onto a tongue supporting the spraying of the abrasive agent and protecting the screen from direct impact by sprayed portions of the abrasive agent. The tongue may be coated with a wear resistant material or a soft, elastic material.

The climbing shaft has its upper end closed by a cover and has an outlet located below the cover on its side wall. the outlet conducts the air stream so that an air eddy forms around the climbing shaft in the eddy chamber. The intake for the suction connection is located over the cover adjacent the center of the eddy chamber. The catching tank is closed by a cover and is connected with a conduit for generating a secondary air flow from the funnel in the drying over through the catching tank to the exhaust chamber.

The invention is to be explained in greater detail below by means of an embodiment.

DETAILED DESCRIPTION OF THE PREFERRED EMBODIMENT

Figure 1:
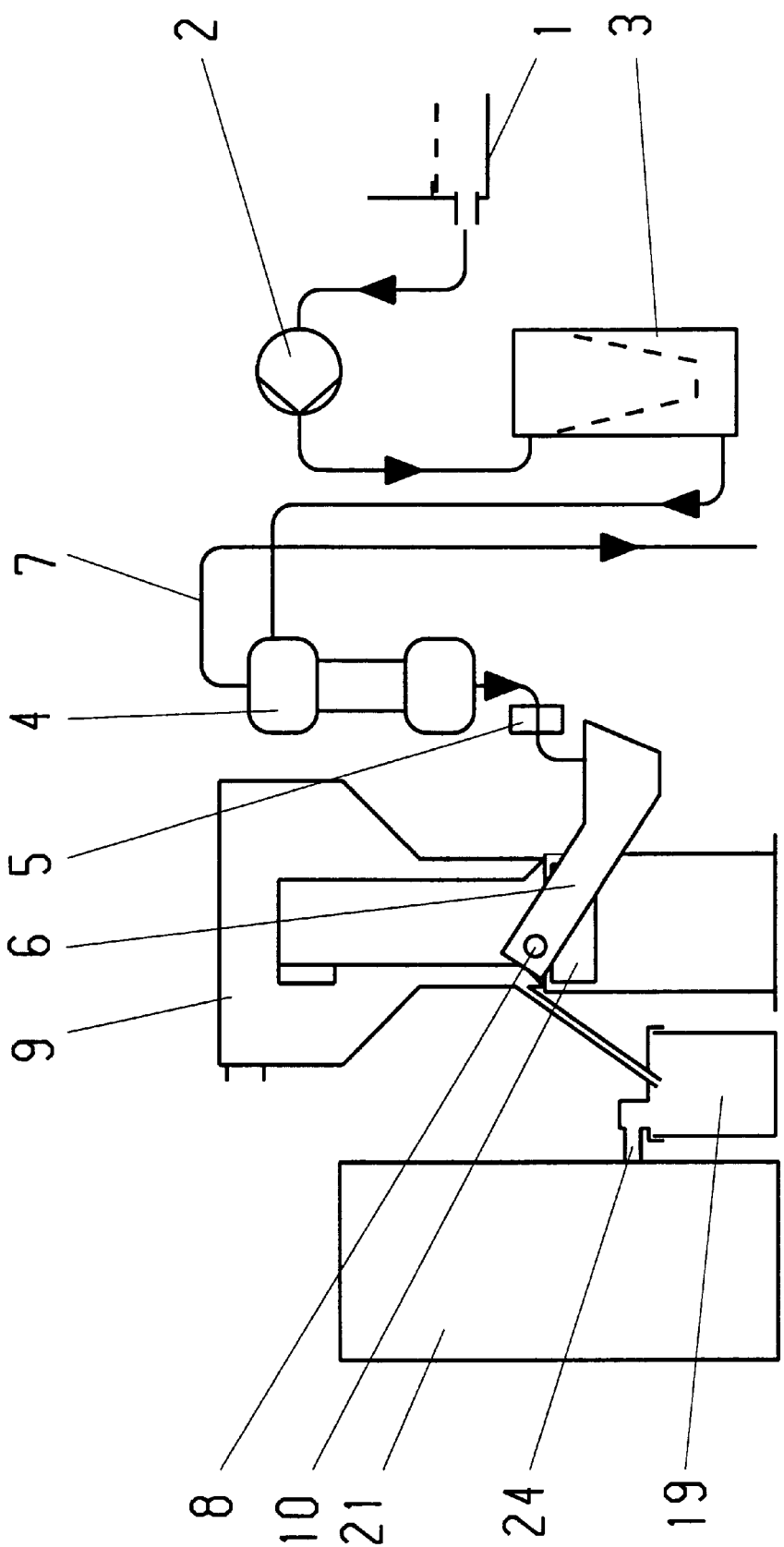
FIG. 1 the schematic design of the arrangement for abrasive agent recovery.
Figure 2:
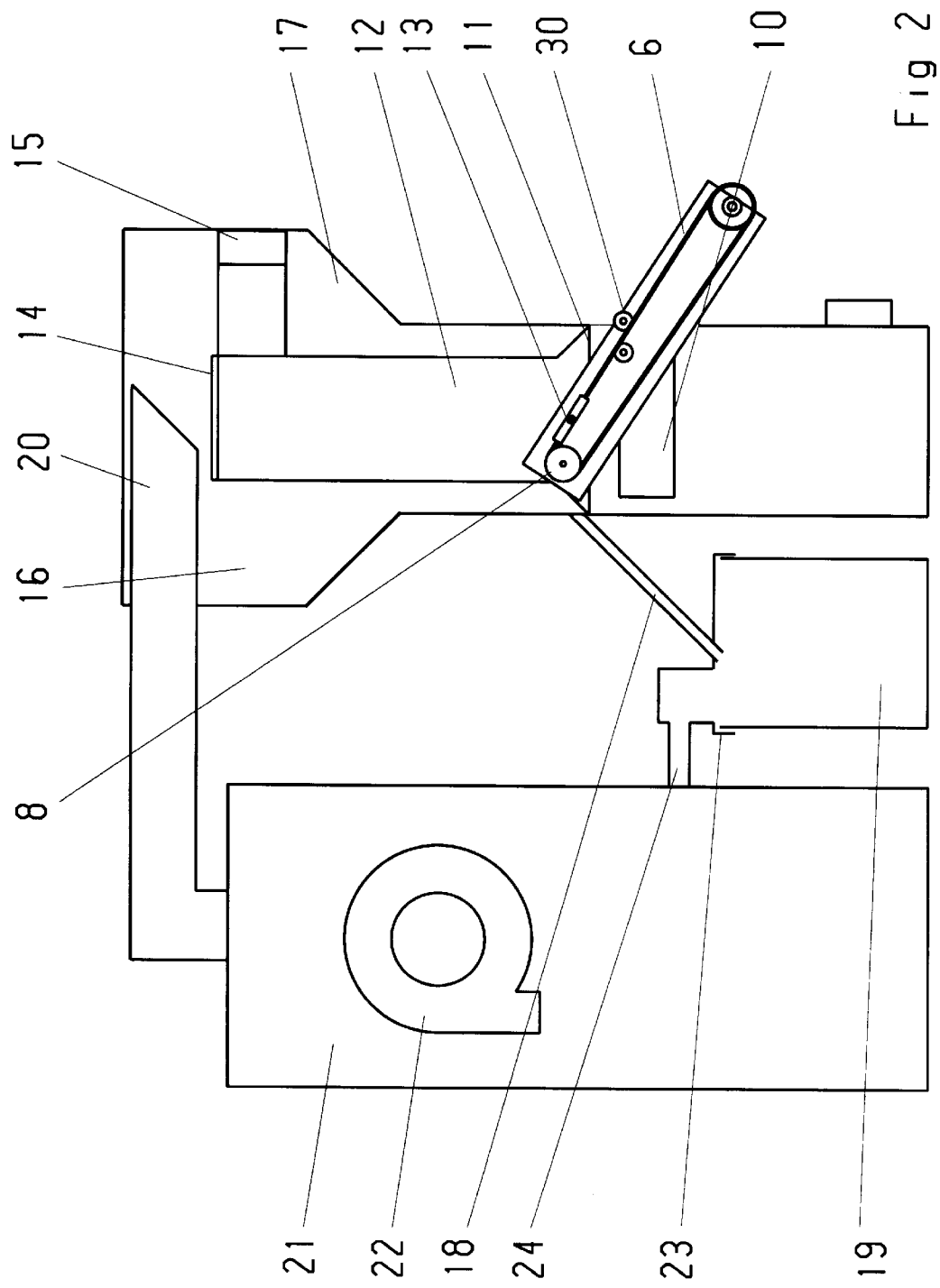
FIG. 2 the inner design of a drying oven.
Figure 3:
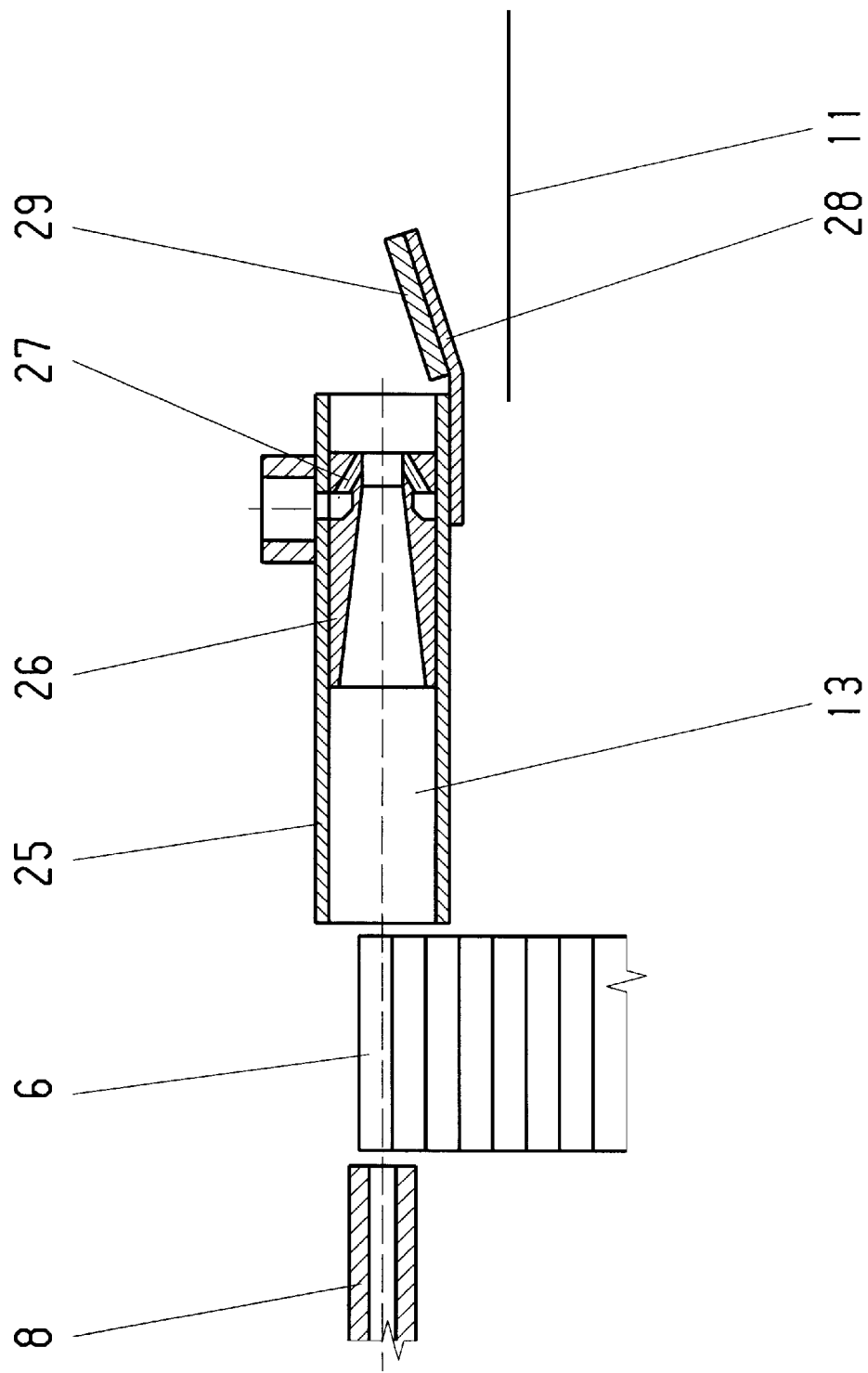
FIG. 3 the design of a spraying nozzle.

The water mixed with cut material residues and abrasive material used in a catching arrangement 1 of a water jet cutting unit is pumped with a contaminated water pump 2 via a coarse filter 3 to a separator 4. There the usable abrasive agent is separated from the sludge and water and placed in portions onto a toothed belt conveyor by a pinch valve 5. Rollers 30 mounted over the toothed belt conveyor 6 press the portions and reduce the water content in them. The water mixed with sludge is delivered to a settling basin (not shown) via a pipe 7. The portions of abrasive agent are blown from a compressed air unit into a drying oven 9. In the drying oven the heated exhaust of a high pressure pump (not shown) is sucked into the drying oven 9 and heated further with a heater 10.

In a climbing shaft 12 of the drying oven 9, closed with a screen 11, the portions of the abrasive agent are blown over the screen 11 via a spraying nozzle 13. The abrasive agent, which is still moist and clinging together, but already widely distributed by the spraying nozzle 13, falls on to the screen 11, and individual, dried granules, and granules separating from clumps, are sucked up by the air stream in the climbing shaft and are dried. The climbing shaft 12 ends in a cover 14, under which an outlet 15 into an eddy chamber 16 is located in the side wall of the climbing shaft 12. The air flowing out of the climbing chamber 12 forms an eddy around the climbing shaft 12, in which the abrasive agent dried in the climbing shaft 12 undergoes a classification according to grain size. In this case the large and usable grains are carried to the wall of the eddy chamber 16 and guided with a funnel 17 via a line 18 into a catching tank 19. Light parts and dust remain in the middle of the eddy and are sucked from the eddy with a suction with connection 20 to the exhaust 21. There the air is purified by a fan 22 driving the entire air stream. The catching tank 19 is closed with a cover 23 and connected with a line 24 connect to it with the exhaust 21. This produces under pressure in the catching tank 19, so that a weak secondary air flow in the line 18 supports the removal of the abrasive material obtained. In this case dust carried along is sucked from the catching tank 19.

The spraying nozzle 13 consists of a nozzle pipe 25, in which a nozzle unit 26 is inserted. Air nozzles 27 standing transverse to the axis of the nozzle unit 26 are located at the mouth of the nozzle unit 26. The nozzle pipe 25 runs in a tongue 28 standing over the screen 11, which tongue is coated with a wear material 29 adjacent the nozzle unit 26. In this way the abrasive agent is distributed better and also the screen 11 is protected from the direct impact by abrasive agent sprayed in front of the nozzle pipe 25.

We claim:

1. An assembly for abrasive agent recovery in water jet cutting units comprising a separator (4) for separating usable abrasive agent from sludge and water, a drying oven (9), a conveyor (6) for transporting the abrasive agent separated into fractions by the separator (4) to the front of a compressed air unit (8) in said drying oven (9) loaded with the fractions of abrasive agent, said compressed air unit (8) cooperating with a spraying nozzle (13) and warmed exhaust air which is heated further in the drying oven (9), said compressed air unit (8) and nozzle (13) causing abrasive agent on said conveyor (6) to flow upwardly through said oven, said oven including a climbing shaft (12) closed at its lower end by a heater (10) and a screen (11), an eddy chamber (16) connecting with said shaft, a funnel (17) located under said eddy chamber (16), a conduit (18) from said funnel to a catching tank (19) for the dried abrasive agent obtained, a suction connection (20) to said eddy chamber (16), and a fan (22) for removing the exhaust air connected with said suction connection (20) through an exhaust chamber (21) which filters the exhaust air.

2. The assembly for abrasive agent recovery in accordance with claim 1 wherein compression rollers (30) cooperate with the conveyor (6) to press the portions of abrasive agent on said conveyor (6).

3. The assembly for abrasive agent recovery in accordance with claim 1 wherein said spraying nozzle (13) consists of a nozzle pipe (25), in which a nozzle unit (26) is located, and at the front of which are opening air nozzles (27) arranged transversely of the axis of the nozzle unit (26).

4. The assembly for abrasive agent recovery in accordance with claim 3 wherein said nozzle pipe (25) extends onto a tongue (28) supporting the spraying of the abrasive agent and protecting said screen (11) from direct impact by sprayed portions of the abrasive agent.

5. The assembly for abrasive agent recovery in accordance with claim 4 wherein said tongue (28) is coated with a wear resistant material.

6. The assembly for abrasive agent recovery in accordance with claim 4 wherein said tongue (28) is coated with a soft, elastic material.

7. The assembly for abrasive agent recovery in accordance with claim 1 wherein said climbing shaft (12) has its upper end closed by a cover (14) and has an outlet (15) located below said cover (14) on its side wall, said outlet conducting the air stream so that an air eddy forms around said climbing shaft (12) in said eddy chamber (16), and said intake for said suction connection (20) is located over said cover (14) adjacent the center of said eddy chamber (16).

8. The assembly for abrasive recovery in accordance with claim 1 wherein said catching tank (19) is closed by a cover (23) and is connected with a conduit (24) for generating a secondary air flow from said funnel (17) in the drying oven (9) through the catching tank (19) to said exhaust chamber (21).

* * * * *